United States Patent [19]

Morrison et al.

[11] Patent Number: 4,896,052
[45] Date of Patent: Jan. 23, 1990

[54] OVERFLOW AND LEAKAGE DETECTION SYSTEM FOR AN AIR CONDITIONING UNIT

[75] Inventors: Daniel R. Morrison; William C. Pickell, both of Key Biscayne, Fla.; William S. Massey, Silver Spring, Md.

[73] Assignee: Liquid Management Systems, Inc., Key Biscayne, Fla.

[21] Appl. No.: 173,480

[22] Filed: Mar. 24, 1988

Related U.S. Application Data

[63] Continuation-in-part of Ser. No. 912,574, Sep. 29, 1986, abandoned.

[51] Int. Cl.$^4$ .......................... F25B 1/00; F25B 49/00
[52] U.S. Cl. ................................... 307/118; 62/228.1; 219/333
[58] Field of Search ............... 62/188, 228.1; 219/333; 307/118; 137/392

[56] References Cited

U.S. PATENT DOCUMENTS

| | | | |
|---|---|---|---|
| 3,069,671 | 12/1962 | Taylor | 219/333 |
| 3,205,676 | 9/1965 | Walker et al. | 62/228.1 |
| 3,209,125 | 9/1965 | Morrissey | 219/333 |
| 3,214,933 | 11/1965 | Morton | 62/188 |
| 3,280,580 | 10/1966 | Constantini et al. | 219/333 |
| 4,061,442 | 12/1977 | Clark et al. | 137/392 |
| 4,084,547 | 4/1978 | Deziel | 219/333 |
| 4,287,407 | 9/1981 | Treiber et al. | 219/333 |

*Primary Examiner*—Bernard Roskoski
*Attorney, Agent, or Firm*—Malloy & Malloy

[57] ABSTRACT

A system to be used in combination with an air conditioning assembly and designed and structured for the detection of collected condensation at a predetermined level within a collection facility associated therewith and prior to actual over flow and also the detection of any leakage from any of the collection facilities or various plumbing components throughout the air conditioning system such that the detection of either excess collected condensation or leakage serves to shut-down the air conditioning assembly. The subject system may also be structured to restart the air conditioning assembly automatically once a level of collected condensation has receded or any leakage has been alleviated.

12 Claims, 1 Drawing Sheet

OVERFLOW AND LEAKAGE DETECTION SYSTEM FOR AN AIR CONDITIONING UNIT

BACKGROUND OF THE INVENTION

This is a continuation in-part-application of presently pending application Ser. No. 912,574 filed on Sept. 29, 1986 now abandoned.

FIELD OF THE INVENTION

This invention relates to a system for detecting the existence of leakage throughout any applicable part of an air conditioning system as well as the detection of excess collected condensation prior to over-flow from any one of a plurality of collection facilities normally associated with an air conditioning assembly.

DESCRIPTION OF THE PRIOR ART

The design and construction of a conventional air conditioning assembly does have certain inherent disadvantages. The accumulation and removal of condensate water and control of algae growth has long plagued the industry. In many instances, corrosive chemicals are used to combat algae growth. This action eventually rusts holes in the drip collector or other collection or containment facilities associated with the air conditioning assembly. Common placement of air conditioning units in a closet with other appliances such as a water heater disposed therebelow, often times prohibits the installation of a secondary collection pan sometimes required or recommended to avoid leakage onto a floor or like supporting surface for the appliances. This leaves leaking condensate to generally collect on the floor and frequently to leak therethrough to cause extensive damage throughout a given building structure. In addition, condensate pumps with their respective holding tanks are often times needed when a gravity drain is not available and of course, collection and plumbing facilities of this type may also leak.

In a conventional air conditioning assembly or system, when a gravity drain is not available, it is common practice to provide some type of secondary collection tank in direct association with the plumbing outlet of the primary condensate drip collector which is located inside the air conditioning unit beneath the evaporator coil. As taught by the Walker U.S. Pat. No. 3,205,676, when condensate entering the secondary tank reaches a predetermined level, a float activated switch will either turn-off the compressor or turn-on a condensate pump provided to empty the tank. The teachings of Walker are designed for the sole purpose of containing or removing condensate water from a holding tank under normal operating conditions. There is disclosed therein no protection of the primary drip collector and its plumbing facilities or outlets or the supporting floor beneath the unit from leaking water. It is obvious that a float switch designed to operate in a tank as taught by Walker could not operate in a standing puddle of water on a flat surface floor. The Taylor U.S. Pat. No. 3,069,671, discloses the use of an overflow pan placed underneath a water heater with an electrical switch mounted on the side wall of the pan. This switch activates an alarm if the water heater leaks and the rising water in the pan reaches a predetermined over flow level. In addition, Taylor discloses an emergency drain line.

The Constantine, et al., U.S. Pat. No. 3,280,580, discloses the use of a collection pan and float assembly to control electrical power to a heating element when a predetermined level of collected condensation is reached. The heating element is designed to evaporate the water in the pan.

While the structures disclosed in the above set-forth patents are assumed to be operable for their intended application and function, they still do not solve certain inherent features recognized in the air conditioning industry. For example, drain facilities of the type described above normally associated with the removal of collected condensate from the area of storage of the air conditioning facility may merely be a drain pipe or a condensate pump directing the collected water from the collection facilities associated therewith to an outside source or drain facility located in the building itself. However, due to the fact that the evaporator coil is located in association with an air handler or like facility, dust and algae frequently find their way onto the associated components of the air conditioning assembly and into the collected water itself. This in turn serves to frequently clog any normal or conventionally structured and sized drain conduit. The clogging of a drain conduit then will of course not adequately remove any excess collected condensation from the primary drip collector and/or secondary containment facility. In addition, the condensate pump motor may fail and its containment reservoir will of course then overflow. The aforementioned rust or corrosion associated with the various collection or plumbing fixtures associated with the removal of the collecting or collected condensation could of course cause the aforementioned leakage and result in the damage to the building or surrounding areas. If such practice continues to go unchecked, the result can be serious water damage to walls, ceilings, floors, etc. depending upon the storage location of the air conditioning unit, air handler, etc.

The prior art has long recognized the use of mechanical float switches as one way of detecting rising water beyond a certain, predetermined level in various collection facilities. The use of such float switches of course have certain disadvantages which are well recognized. Specifically, a float switch is only capable of monitoring water level in one containment structure at a time thereby requiring numerous float switches to protect all parts of an air conditioning system as well as the auxiliary equipment associated therewith. Float switches are specifically structured to be in constant or fairly regular contact with the water being collected and thereby promote serious and rapid algae growth with the attendant disadvantages as set forth above. To function, floats switches need a minimum predetermined depth of water commonly found in a secondary containment structure. The design of air conditioning systems, primary dripcollectors and of course, the floor beneath the system, often does not meet this minimum depth requirement, making the use of a float switch impossible. Other prior art attempts to overcome numerous of the above-set forth problems are set forth in the U.S. Pat. Nos.: 977,055 to Turek; 1,188,603 to Amrhein; 3,185,789 to Guuther; 3,236,061 to Wells; 4,037,427 to Kramer and 3,460,168 to BeBruyne.

SUMMARY OF THE INVENTION

This invention, while applicable to any type of water or liquid monitoring system, is primarily directed to a detection system for use with a conventional air conditioning assembly and its auxiliary equipment. The air conditioning assembly of the type referred to can be what is commonly known as a central air conditioning system used for either residential or commercial building facilities. In addition, the subject detection system can be used in combination with other types of refrigeration devices and is primarily designed to prevent the over-flow of accumulated excess condensation such as in a typical air conditioning system as well as the detection of any leakage from the containment or collection facilities associated with the air conditioning system or the plumbing components used therewith. As set forth above, relatively conventional plumbing facilities including drain conduits, secondary collection pans and/or condensate pumps are normally associated with the primary collection pan in order that any excess water or leakage can be continuously removed from the collection facility in order to prevent over-flow. However, due to the normally less than clean environment in which the air handler, cooling coil and collection structure is positioned as well as the corrosive influence of any algae growth prohibitor, the removal or take-off drain conduits or like plumbing structures as being a part thereof often times become clogged, rust-through or otherwise fail to properly carry collected condensation away from the collection facilities associated with the air conditioning unit. In turn, a continuous overflow or leakage of frequently large amounts of water occurs which in turn may frequently cause expensive property damage to the surrounding building components such as the floors, ceilings, walls, etc. of the building in which the air conditioning system is stored.

Accordingly, the present invention is directed towards an electronically actuated and operated detection system using a plurality of remote probes capable of determining the collection of excess condensation and/or the existence of leakage from evaporator coils associated with a conventional air conditioning unit. In addition, the subject detection system is also capable of determining the existence of water leaking from the various associated conduits, pumps, collection facilities, or other plumbing components associated with the air conditioning unit to the extent that leakage occurs on a floor or other supporting surface outside of the collection facilities. Upon the detection of excess condensation or water, whether it be in the primary drip-collector, the secondary pan, or the floor beneath the unit, a sensing mechanism including a control means will serve to shut down operation of the air conditioning unit by the interruption of current from a current source. This, of course, will have the effect of stopping the accumulation of additional condensation and prevent additional property damage to the surrounding structures.

By virtue of the use of the system of the present invention, the required need for secondary collection pans or like facilities at locations which frequently do not allow the convenient or efficient placement thereof is eliminated. This is due in part to the fact that the greater amount of space required for use of a mechanical float switch is eliminated and any leakage collected even to a minor degree on supporting floor surfaces or like surrounding areas is immediately detected. Naturally, float switches can not be used to detect small amounts of leaking water accumulated on the floor in puddles.

The invention accordingly comprises the features of construction, a combination of elements and an arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figures 1, 2, 3, 4:
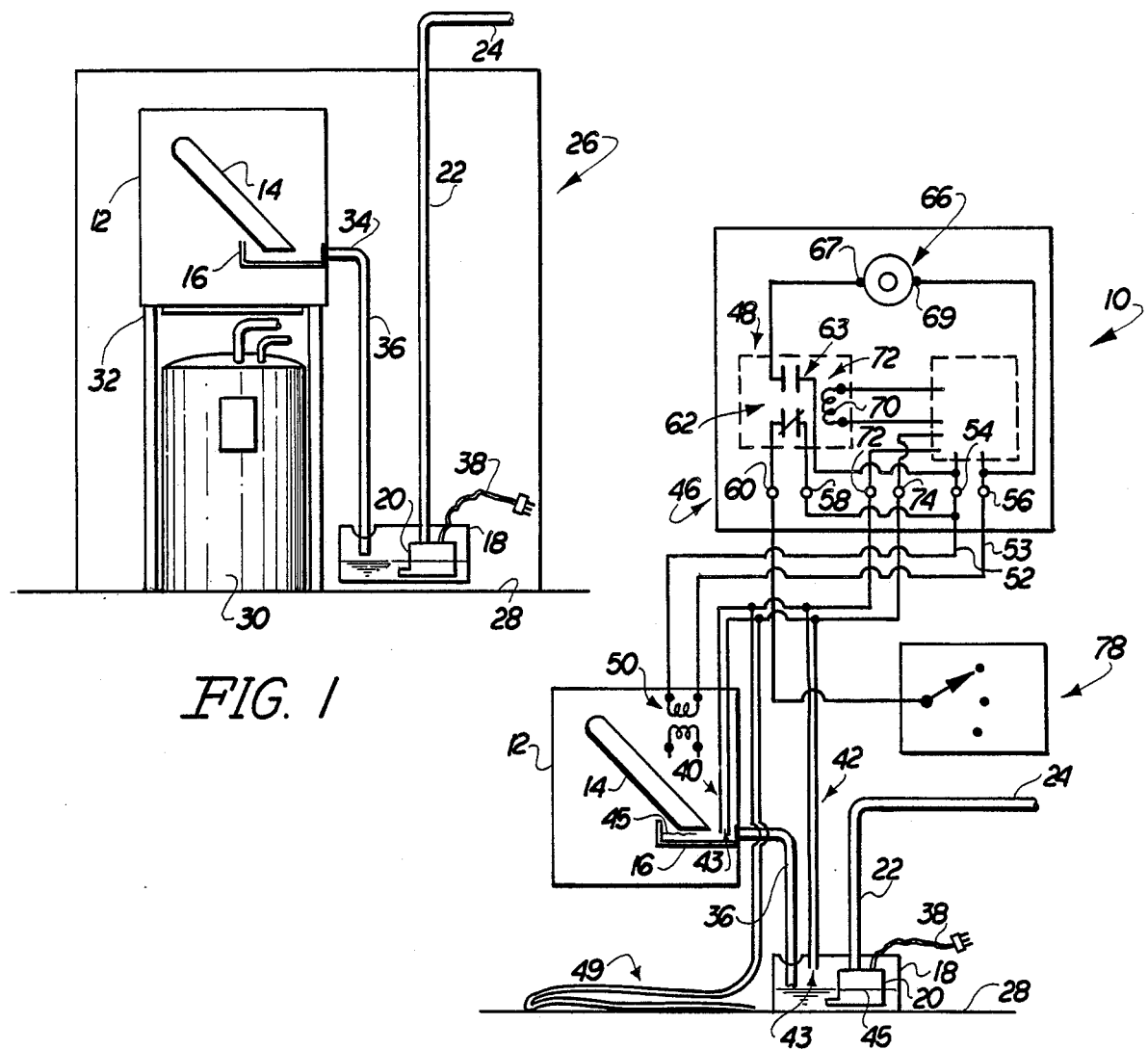
FIG. 1 is a schematic representation of portions of a conventional air conditioning assembly, a closed closet or like environment in which it is mounted and other appliances which may be associated therewith.
FIG. 2 is a schematic representation of certain workings of a sensing mechanism and control structure associated with the detection system of the present invention.
FIG. 3 is a perspective view in partial cut-away showing detail structure of a secondary, ribbon probe associated with the subject detection system. 8
FIG. 4 is a sectional view along line 4—4 of FIG. 3.

As shown primarily in FIG. 1 and 2, the present invention is directed towards a detection system generally represented as 10 in FIG. 2. The detection system is associated with what may be considered conventional air conditioning equipment or assembly including an air handler 12 evaporator coils 14, a primary collection pan or facility 16, a secondary or holding tank assembly 18 including a sump pump or like structure 20 designed to remove collected condensation through a drain line 22 carrying the water from the collection facility 18 to the closest gravity drain as at 24.

With regard to FIG. 1, the enclosure 26 is representative of a closet or like structure including a supporting floor 28 in which the air handler 12, evaporator coils 14, and primary collection facility or drip collector 16 is mounted. Any other applicable or like appliance such as a water heater 30 may be mounted below the air handling unit 12 and the placement of the water heater or like appliance 30 at this location is evidence of the small amount of excess room normally existing in any type of enclosure or closet 26. The placement of any type of safety or secondary collection facility to collect leaks or the like is thereby extremely difficult or impossible to locate.

A supporting rack 32 of common construction may be used to support the air handler 12. The primary drip collector or collection facility 16 is of course located directly below and in condensation receiving relation to the evaporator coil 14 of the air handler 12. The primary collector 16 has an outlet as at 34 connected to the conduit 36 leading the collected condensate from coil 14 to the collection facility 18 associated with the pump 20. A conventional power supply cord as at 38 is indicated to power the pump 20 from any conventional source of electrical power. When a predetermined level of collected condensation is reached within the holding tank 18 the pump 20 will be activated and remove the excess condensate through the drain line 22 as set forth above.

With regard to FIG. 2, a schematic representation shown therein includes a sensor mechanism in the detection system of the present invention wherein the sensor mechanism comprises a plurality of probes including a first probe 40 associated with the primary collector 16 and at least a second probe 42 associated with the holding tank 18. Each of the probes extend outwardly from a control means generally indicated as 46 including as being a part thereof, a switching means 48. The distal ends of the probes 40 and 42 are defined by a bi-electrode type probe tip 43 with a single sensor point. Each of the probe tips 43 are associated with one only of a plurality of collection facilities as at 16 and 18 associated with the air conditioning assembly and each are located at what may be referred to as an overflow level. The overflow level may be predetermined dependent upon the size, shape and configuration of the collection facilities 16 and 18 but preferably each are disposed at a level at least immediately prior to the level of water or collected condensation as at 45 overflowing a given collection facility in which it is located.

The plurality of probes of the sensor mechanism further include at least one supplementary probe generally indicated as 49 and extending outwardly from the control means 46. The supplementary probe 49 specifically has an elongated configuration as shown in detail in FIGS. 3 and 4 and is designed to be placed on the floor or like supporting surface 28 for the purpose specifically of detecting any collection of puddles to leaks from any of the collection facilities, drain conduits, pump facilities or like plumbing fixtures or components associated with the air conditioning system or the removal or collected condensation from the enclosed area as at 26. Details of the supplementary probe 49 will be discussed in greater detail with specific reference to FIGS. 3 and 4. The control transformer generally indicated as 50 located within the air handler 12 serves as the power supply for the sensor mechanism and control means generally indicated as 46. Such control transformer may be a 24 volt transformer as is well known in the art. The control transformer 50 is connected via conductors 52 and 53 to the terminals 54 and 56 of the control means and/or sensor mechanism. Terminal 54 is connected to terminal 58 in the sensor mechanism which is connected to terminal 60 through a first switch structure generally indicated as 62 of the switch means 48. Terminal 58 is also connected to a second switch structure 63 of the switch means 48 which in turn is connected to a indicating structure or means preferably in the form of a light or like applicable visual indicator generally indicated as 66 as at a warning light terminal 67. Terminal 69 connects the visual indicator means 66 to terminal 56. Power terminals 54 and 56 of the sensor mechanism are also interconnected through applicable circuitry including a series of diodes, resisters, and the like to the coil 70 defining part of a relay 72 which also may be considered a portion of the switching means 48. The terminals 72 and 74 defines the probe terminals to which each of the probes 40, 42 and 49 are connected by applicable conductors as shown in FIG. 2 and each of the plurality of probes are connected in parallel to the probe terminals 72 and 74. Terminal 60 connects the control means and sensor mechanism to the power terminal of the air conditioning thermostat means itself being indicated as 78.

With reference to FIGS. 3 and 4, the supplementary probe 49 has an elongated configuration and may be referred to as a ribbon type probe. The probe 49 comprises two spaced apart electrical conductors 80 and 82 formed from a conductive material and separated at least in part by insulative material sections 84 which are preferably at least partially connected by insulating material strips 84'. These strips 84' cover at least a portion of the conductors and leave a portion thereof exposed. Accordingly, a plurality of open portions 86 a defined along the length of the ribbon probe 49 and are therefore constructed to have an exposed, open construction. By virtue of these open portions and the aforementioned open construction, any collected liquid which may appear on the floor or like supporting surface 28 can bridge the two conductors 80 and 82 at any local where the insulative material 84 is absent. This will serve to of course complete the circuit and activate the switching means 48 and control means for interruption of current flow to the air conditioning assembly. Therefore, the ability to place the secondary probe 49 at any applicable or convenient location enables the protection of the entire system from leakage in addition to specifically the protection of the collection facility 16 and 18 from over flow. Therefore, any leakage due to corrosion, clogging, etc. resulting in leakage on the floor or supporting surface 28 will be detected independently of the existence of the probes 40 and 42 associated directly with separate ones of the collection or containment facilities 16 and 18.

When the primary collector 16, sump pump 20 or plumbing drain lines as at 34, 36 or 22, etc. become clogged or disabled, or both, probe tips associated with the respective drain facilities 16 and 18 will detect an excess of collected condensation in the respective ones of the collection pans or facilities 16 and 18. This will result in a de-energization of the coil 70 in the relay 72 which will in turn open the first switch structure 62 terminating power to the air conditioning thermostat 78 and in turn close the second switch structure 63 serving to energize the visual indicator 66. When the water level subsides, the system will automatically restart.

In addition, the detection system of the present invention has the additional versatility of detecting leaks on the floor or like supporting surface 28 caused by any of the collection facilities 16 or 18 or inoperability or corrosion of the pump 20 or drain line 36 and 22. Similarly, inadvertent failure of the water heater 30 (see FIG. 1) resulting in leakage on the floor or supporting surface 28 will also be detected and serves to activate the warning light or visual indicator 66 even though the air conditioning and its associated components per say are not inoperative or malfunctioning.

Now that the invention has been described,

What is claimed is:

1. An air conditioning assembly including an overflow detector system for the sensing of leaks from the air conditioning assembly, said air conditioning assembly comprising, in combination,
   (a) an air conditioning unit having collection means for the collection of overflow condensation therein,
   (b) a sensor mechanism connected to an electrical power source and including at least one probe extending outwardly therefrom into operative relation to said collection means,
   (c) said one probe positioned at a predetermined overflow level on said collection means, said predetermined overflow level defined by water contact with said one probe prior to overflow from said collection means,
   (d) control means electrically connected to said sensor mechanism and said power supply and structured for regulating current flow from said power supply to said sensor mechanism and for further regulating activation and deactivation of the air conditioning unit, (e) at least one supplementary probe extending outwardly from said sensor mechanism and positioned in liquid sensing relation on a supporting surface for said air conditioning unit in receiving relation to overflow condensation from said collection means or plumbing components associated therewith, (f) said one supplementary probe comprising an elongated configuration and including two spaced apart conductors extending the length thereof and interconnected to one another and partially covered at spaced apart locations along the length of said supplementary probe by insulating material, said one supplementary probe disposed on the supporting surface and configured to sense liquid collected thereon, (g) said control means including switching means electrically interconnected to said one probe and to said electrical power source for regulating activating current to the air conditioning unit.

2. An assembly as in claim 1 wherein said switching means comprises at least a first switch structure positionable between a current on and a current off position and interconnected to said one probe and independently activatable thereby to regulate current flow between said electrical power source and the air conditioning unit.

3. An assembly as in claim 1 wherein said switching means comprises at least one switch structure positionable between a current on and a current off position and interconnected to each of said one probe and said supplementary probe and independently activatable thereby, said one switch structure further connected to a power terminal of said thermostat means and further structured to establish and interrupt current flow from said electrical power source to said thermostat means dependent on said one said one switch structure being disposed in a current on or a current off position due to activation by said one probe or said one supplementary probe.

4. An assembly as in claim 1 wherein said sensor mechanism includes a plurality of probes in addition to said supplementary probe, said plurality of probes extending outwardly therefrom into operative relation to said collection means, said collection means comprising a plurality of collection facilities, each of said plurality of probes positioned at a preselected overflow level on a respective one of said plurality of collection facilities, said predetermined overflow level defined by water contact with said respective probe prior to overflow from said respective one of said collection facilities, said switching means comprising at least a first switch structure positionable between a current on and a current off position and interconnected to each of said plurality of probes and independently activatable thereby to regulate current flow between said electrical power source and said air conditioning unit.

5. An assembly as in claim 4 further comprising an indicating means connected to said switching means for indicating a current on or a current off mode of the air conditioning unit; said switching means comprising a second switch structure positionable between a current on and a current off position and interconnected to each of said plurality of probes and said supplementary probe and independently activatable thereby to regulate current flow between said electrical power source and said indicating means.

6. An assembly as in claim 1 further comprising an indicating means connected to said switching means for indicating a current-on or a current-off mode of the air conditioning unit.

7. An assembly as in claim 6 wherein said switching means comprises a second switch structure positionable between a current on and a current off position and interconnected to said one probe and independently activatable thereby to regulate current flow between said electrical power source and said indicating means.

8. An assembly as in claim 6 wherein said indicating means comprises a visual indicator structure.

9. An assembly as in claim 1 further comprising a thermostat means electrically connected to said air conditioning unit for activation and deactivation thereof within certain temperature parameters, said control means interconnected in current regulating relation between said electrical power source and said thermostat means and structured to regulate current flow therebetween.

10. An assembly as in claim 9 wherein said switching means comprises at least one switch structure positionable between a current-on and a current-off position and interconnected to each of said plurality of probes and independently activatable thereby, said one switch structure further connected to a power terminal of said thermostat means and further structured to establish and interrupt current flow from said electrical power source to said thermostat means dependent on said one switch structure being disposed in a current-on or a current-off position due to activation by any one of said plurality of probes.

11. An assembly as in claim 1 wherein said insulating material comprises a plurality of open portions formed therein and extending along the length of said two conductors in spaced-apart relation, each of said open portions being dimensioned and configured for exposure of said conductors and concurrent liquid contact of the conductors therewith.

12. As assembly as in claim 1 wherein each of said probes are inter-connected in parallel to said switching means and each being structured to independently position said switching means between an air conditioning activating position and deactivating position.

* * * * *